United States Patent [19]

Harper

[11] Patent Number: 4,848,445

[45] Date of Patent: Jul. 18, 1989

[54] HEAT TRANSFER APPARATUS AND METHOD

[75] Inventor: Allen D. Harper, Phoenix, Ariz.

[73] Assignee: Allied-Signal Inc., Morris Township, Morris County, N.J.

[21] Appl. No.: 114,799

[22] Filed: Oct. 28, 1987

[51] Int. Cl.⁴ ............................................. F28F 27/00
[52] U.S. Cl. ...................................... 165/46; 165/96; 165/104.19; 165/80.5; 165/80.1; 165/41
[58] Field of Search ............... 165/46, 32, 96, 78, 165/104.19, 80.5, 80.3, 80.2, 80.1

[56] References Cited

U.S. PATENT DOCUMENTS

| | | | |
|---|---|---|---|
| 3,225,820 | 12/1965 | Riordan | 165/96 |
| 3,229,756 | 1/1966 | Keresztury | 165/80.3 |
| 3,476,177 | 11/1969 | Potzl | 165/80.3 |
| 3,586,100 | 6/1971 | Yasuda et al. | 165/80.3 |
| 4,009,423 | 2/1977 | Wilson | 165/46 |

FOREIGN PATENT DOCUMENTS

| | | | |
|---|---|---|---|
| 1494151 | 7/1967 | France | 165/46 |
| 204149 | 11/1983 | German Democratic Rep. | 165/46 |

Primary Examiner—Albert W. Davis, Jr.
Attorney, Agent, or Firm—Terry L. Miller; James W. McFarland

[57] ABSTRACT

A heat transfer apparatus and method wherein an expansible heat transfer member is disposed between a heat source member removably disposed within a cavity defined by a heat receiver member. The heat receiver is configured as a heat exchanger transferring received heat to an external system for utilization. The heat transfer member both removably couples the heat source and heat receiver mechanically as well as providing a favorable heat conductive path therebetween.

11 Claims, 2 Drawing Sheets

HEAT TRANSFER APPARATUS AND METHOD

TECHNICAL FIELD

The field of the present invention is heat transfer apparatus and method. More particularly, the present invention relates to apparatus and method for transferring heat between a heat exchanger and a heat source. Still more particularly, the present invention relates to an apparatus and method for transferring heat between a stored chemical energy heat source and a heat exchanger receiving heat from that heat source and transferring the received heat to a working fluid flowing through the heat exchanger.

BACKGROUND ART

A conventional stored chemical energy heat source is known in accord with U.S. Pat. No. 3,325,318 issued June 13, 1967 to Richard S. Pauliukonis and assigned to TRW, Incorporated. This patent teaches a stored chemical energy heat source wherein lithium metal is reacted with sulfur hexafluoride to produce lithium sulfide and lithium fluoride as well as heat energy. The teaching of U.S. Pat. No. 3,325,318 is that such a stored chemical heat source may be used in missiles, satellites, or torpedoes as well as direct thermal electric conversion devices. However, U.S. Pat. No. 3,325,318 does not otherwise deal with the details of applying the heat energy obtained from the chemical energy heat source in a practical application.

Another conventional teaching is set forth in the U.S. Pat. No. 3,964,416 issued June 22, 1976 to Raymond J. Kiraly, et. al., and assigned to the United States of America. The U.S. Pat. No. 3,964,416 teaches a stored chemical energy heat source wherein a fuel storage and reaction chamber also includes a heat exchanger. A mass of lithium metal is contained within the fuel storage and reaction chamber and is therein reacted with sulfur hexafluoride to produce heat and the reaction products mentioned earlier. The heat of this reaction is extracted from the fuel storage and reaction chamber via the integral heat exchanger consisting of a closed loop of heat transfer tubing conveying a flow of heat transport fluid therein.

While U.S. Pat. No. 3,964,416 would appear to effect a practical application of the chemical energy heat source taught by the earlier U.S. Pat. No. 3,325,318, it appears immediately that once the reactin chamber is utilized to provide heat, the lithium sulfide and lithium fluoride reaction products must be removed from the reaction chamber in order to allow its refueling and subsequent reuse. Alternatively, the reaction chamber can simply be discarded after removal of unreacted lithium fuel. Of course, this alternative presents the undesirable aspect of simply throwing away a complex and expensive structure which, were it possible to renew its fuel charge, would in all likelihood be useable to react several batches of fuel. It must be noted in this respect that the lithium fluoride and lithium sulfide reaction products of sulfur hexafluoride with the metallic lithium result in a rock-like or cement-like mass filling the reaction chamber. This mass of reaction products is not easily removed from the reaction chamber, and also contains unreacted lithium which presents environmental hazards if the reaction chamber is simply discarded after a single use.

In view of the above, the need is apparent in the pertinent art for the solution to the problem of refueling such a stored chemical energy reaction chamber wherein lithium metal or another metallic fuel is reacted with sulfur hexafluoride or another reactant.

DISCLOSURE OF THE INVENTION

The present invention provides a cup-like heat exchanger having a circumferentially and axially extending wall to which a plurality of heat transfer tubes conveying a heat transport fluid are attached or carried in heat exchange relation. Within the cavity of the heat exchanger a stored chemical energy reaction chamber is received and defines a circumferentially and axially extending outer wall through which heat energy is delivered. This outer wall of the stored chemical energy reaction chamber confronts but does not touch the inner wall of the cup-like heat exchanger. Intermediate of the cup-like heat exchanger and the stored chemical energy reaction chamber a sleeve-like tubular heat transfer apparatus is disposed. This heat transfer apparatus is radially expansible so that the three components of the stored chemical energy system may be assembled simply by sliding the heat transfer member into the cavity of the cup-like heat exchanger and sliding the stored chemical energy reaction chamber into the sleeve-like heat transfer member.

Once the three components are nested together in the manner as described immediately hereinabove, the heat transfer member is radially expanded or swollen both to mechanically unite the cup-like heat exchanger and the stored chemical energy reaction chamber as well as to provide a very favorable rate of heat transfer therebetween. Once the stored chemical energy reacion chamber has been operated, that is after sulfur hexafluoride or another reactant has been introduced therein to react with the fuel thereof and to produce heat energy, the reaction chamber may be removed from the heat exchanger simply by contracting the heat transfer member to relieve the mechanical coupling between the heat exchanger and the reaction chamber and then withdrawing the reaction chamber outwardly of the cavity defined within the heat exchanger.

Because the fuel storage and reaction chamber is a relatively inexpensive part of the entire assembly, this item may be simply discarded. Alternatively, the fuel storage and reaction chamber may be recharged with lithium fuel and used again. In either case, a fresh fuel storage and reaction chamber may be inserted into the cavity of the heat exchanger with the heat transfer member interposed therebetween to immediately allow the stored chemical energy system to be operated again. In this way the stored chemical energy power system may be quickly refueled and operated through a plurality of operating cycles without the necessity of disassembling the entire system or throwing away very expensive component parts thereof.

BEST MODE FOR CARRYING OUT THE INVENTION

Figure 1:
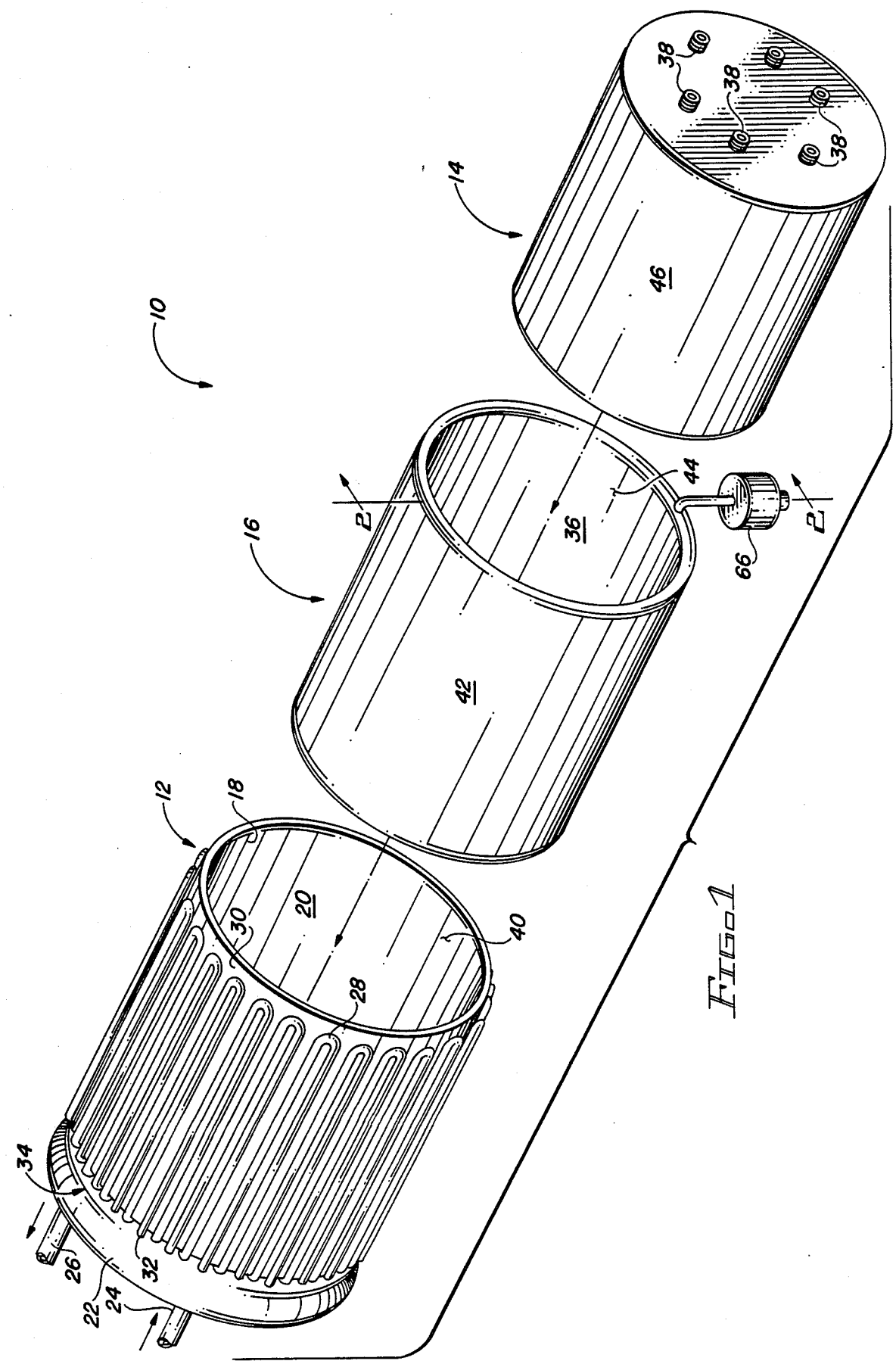
FIG. 1 presents an exploded isometric view of a heat source including a stored chemical energy reaction chamber and heat exchanger embodying the present invention.

Referring to FIG. 1, a stored chemical energy power system (10) is depicted including a heat exchanger generally referenced with the numeral (12), a fuel storage and reaction chamber generally referenced with the numeral (14), and a sleeve-like heat transfer member referenced with the numeral (16). Referring now more particularly to the heat exchanger (12), it will be seen that this heat exchanger includes an elongate, axially extending wall (18) defining a cavity (20) therein. At one end of the wall (18) an annular distribution member or manifold 22 is disposed, the distribution member is radially divided internally into a radially outer inlet chamber and a radially inner outlet chamber (neither one of which are visible in FIG. 1). An inlet 24 connects with the inlet chamber of distribution manifold (22) while an outlet (26) connects with the outlet chamber thereof. A plurality of U-shaped, elongate tubes (28) connect with the distribution manifold (22) and are carried upon the outer surface (30) of the wall (18) in heat transfer relation therewith. Each of the tubes (28) includes an inlet end (32) connecting with the inlet chamber of distribution manifold (22) and an outlet end (34) which is not visible in FIG. 1 but which connects with the radially inner outlet chamber of distribution manifold (22).

Slidably received within the chamber (20) of heat exchanger (12) is a sleeve-like, cylindrical, elongate heat transfer member (16). The heat transfer member (16) has an axial length similar to that of the chamber (20) of heat exchanger (12). Also similarly to the heat exchanger (12), the heat transfer member (16) defines an axially elongate chamber (36) therein. The structure and function of the heat transfer member (16) will be more fully dealt with hereinafter. Additionally, received within the chamber 36 of the heat transfer member 16, and consequently within the chamber (20) of heat exchanger (12), is a cylindrical, elongate fuel storage and reaction chamber (14). The fuel storage and reaction chamber (14) is a relatively simple structure as depicted, being a simple cylindrical housing defining a chamber therein wherein is received a mass of fuel for reaction with a reactant introduced thereto. As is seen in FIG. 1, the fuel storage and reaction chamber (14) includes a plurality of inlet ports (38) through which a reactant such as sulfur hexafluoride may be introduced for a reaction within the chamber (14).

Having observed an overview of the structure depicted in FIG. 1, it will be noted that the wall (18) of heat exchanger (12) defines an elongate, circumferentially extending and radially inwardly disposed heat exchange surface (40) in part defining the cavity (20). Similarly, the heat transfer member (16) defines an elongate, circumferentially extending and radially outwardly disposed heat transfer surface (42) confronting that heat transfer surface (40) of the heat exchanger (12). Still further, the heat transfer member (16) defines an elongate, circumferentially extending and radially inwardly disposed heat transfer surface (44) analogous to that surface (40) of the heat exchanger (12) and in part defining the cavity (36) of the heat transfer member (16). Finally, the fuel storage and reaction chamber (14) defines another elongate, circumfernetially extending and radially outwardly disposed heat transfer surface (46) through which heat energy is delivered upon reaction of the fuel stored therein with reactant introduced via the ports (38). It will be understood that the heat transfer member (16) is slidably received into the cavity (20) of the heat exchanger (12) and at the fuel storage and reaction chamber (14) is slidably received into the chamber (36) of the heat transfer member (16). Consequently, the surfaces (40) and (42) confront one another while the surfaces (44) and (46) also confront one another.

Figure 2:
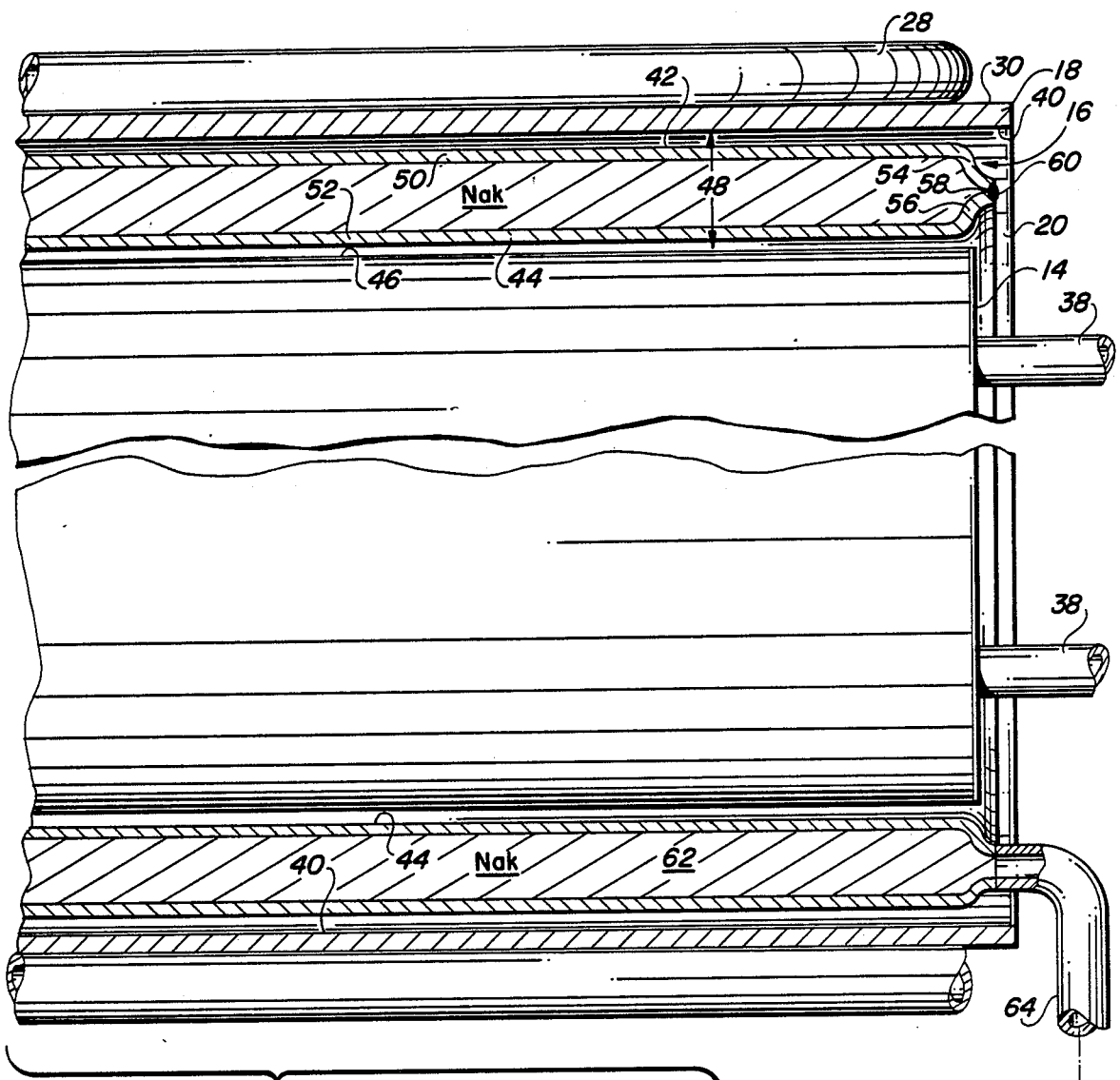
FIG. 2 presents an enlarged fragmentary cross-sectional view of the apparatus depicted in FIG. 1 and taken along section line 2—2 thereof.

Turning now to FIG. 2, it is seen that the surface (46) of fuel storage and reaction chamber (14) defines an axially extending radial gap (48) with the surface (40) of heat exchanger (12). The sleeve-like, elongate, cylindrical heat transfer member (16) is slidably received into the gap (48) such that the outer surface (42) confronts and slidably engages the surface (40) of heat exchanger (18). Similarly, the surface (44) of the heat transfer member (16) confronts and slidably engages the surface (46) of the fuel storage and reaction chamber (14). Further examination of the heat transfer member (16) will reveal that the latter comprises a pair of elongate, circumferentially extending and radially spaced apart walls (50) and (52). The walls (50) and (52) each are of relatively thin shape-retaining, yet flexible, metal. By way of example only, the walls (50) and (52) may be fabricated of relatively light gauge stainless steel sheet material. At each axial end of the walls (50) and (52), the latter each include a radially extending marginal edge portion (54) and (56) respectively. The marginal edge portions (54) and (56) extend radially toward one another and meet to define a joint line (58). A circumferentially extending weld bead (60) at the joint line (58) sealingly unites the walls (50) and (52). Consequently, a circumferentially extending chamber (62) is defined between the walls (50) and (52) within the sleeve-like heat transfer member (16). A conduit member (64) connects with the heat transfer member (16) and communicates the chamber (62) thereof with a chambered housing (66).

Within the chamber (68) of housing (66) a bellows member (70) is received which divides the chamber (68) into a first and second variable volume chambers (72) and (74) which expand and contract in opposition in response to movement of the bellows member (70). The chamber (72) is communicated via the conduit member (64) with the chamber (62) of heat transfer member (16). All of the volume defined within the chamber (62), chamber (72), and conduit member (64) is substantially entirely filled with a liquid heat transfer medium having a relatively low vapor pressure at the elevated operating temperatures as are expected to be experienced during operation of the fuel storage and reaction chamber (14). Additionally, the heat transfer liquid desirably has a comparatively high rate of heat transfer conductivity. The Applicant has discovered that a eutectic mixture of sodium and potassium is an advantageous heat transfer liquid for use in the present invention. This eutectic mixture of sodium and potassium has a low vapor pressure at the elevated temperatures expected in the present invention and also has a desirably high heat transfer coefficient. Additionally, this eutectic mixture of sodium and potassium is a liquid at room temperatures and is therefore relatively easily handled during manufacturing of the heat transfer member (16).

Figure 3:
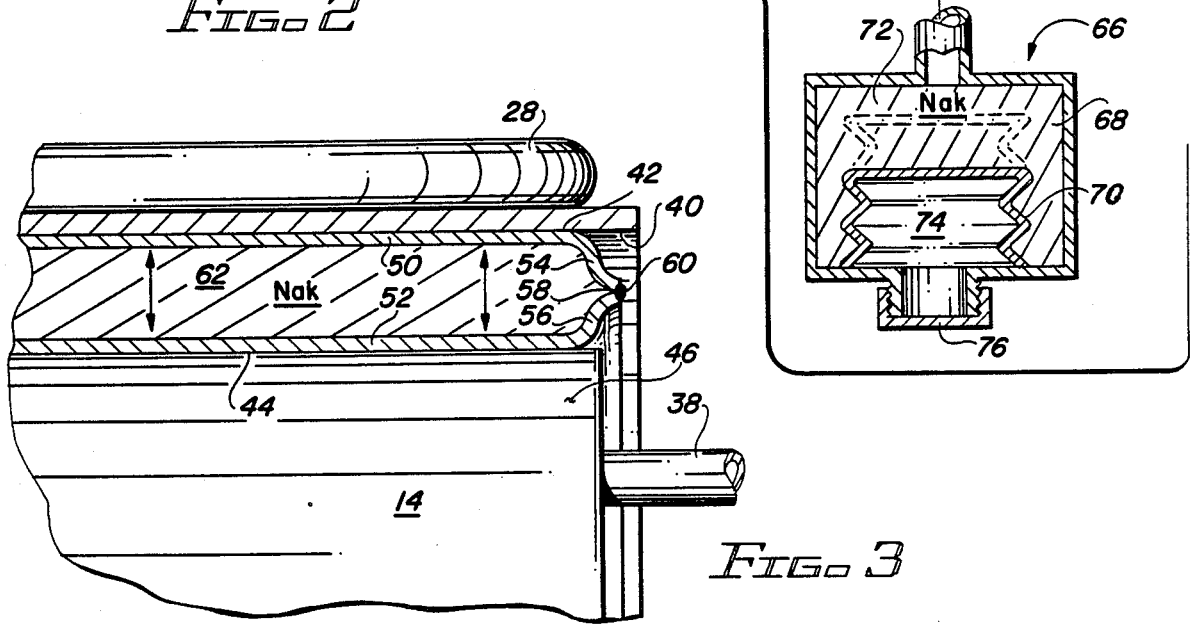
FIG. 3 depicts a fragmentary cross-sectional view similar to the upper right quadrant of FIG. 2, and showing parts thereof in alternative operative positions.

Viewing now FIGS. 2 and 3 in conjunction with one another it will be seen that the bellows member (70) within the chambered housing (66) is moveable between a first position illustrated in solid lines and a second position illustrated in dash lines. In the solid line position of the bellows member (70) the heat transfer member (16) occupies a position as depicted in FIG. 2 wherein the walls (50) and (52) are each slidably engaging with the surfaces (40) and (46) of the heat exchanger and fuel storage and reaction chamber, respectively. The chambered housing (66) includes a port (76) whereby the interior of bellows member (70) may be connected with a source of pressurized gas such as argon gas at an elevated pressure. When the bellows member (70) is expanded by pressurizing the chamber (74) with such a pressurized gas, the bellows member expands into the dash line position thereof depicted in FIG. 2 displacing substantially incompressible liquid from the chamber (72) through conduit member (64) and into the chamber (62) of the heat transfer member (16). Consequently, the heat transfer member (16) expands radially or swells as is depicted by the radially extending arrows in FIG. 3 to mechanically engage with the surfaces (40) and (46) of the heat exchanger (12) and reaction chamber (16).

As a result, the reaction chamber (14) is captured within the cavity (20) of the heat exchanger (12) and a desirably favorable heat transfer relationship is established therebetween. That is, the heat transfer member (16) makes intimate heat transfer relationship both with the heat exchanger (12) and with the reaction chamber (14) at the surfaces (40) and (46), respectively, thereof.

Alternatively, the chamber (74) within bellow member (70) may be connected with a source of vacuum via the port (76) so that liquid is withdrawn from the chamber (62) of the heat transfer member via conduit member (64) and into the chamber (72) of the chambered housing (66). Such withdrawal of liquid from the chamber (62) not only assists in relieving the mechanical interlocking of the reaction chamber (16) within the heat exchanger (12) but also assists in breaking any adhesion which may have developed between the surfaces (40), (42), (44) and (46) as the result of the elevated operating temperatures experienced during reaction of the fuel within chamber (14) during operation thereof. As a result, when the heat transfer member (16) is contracted once again to its position illustrated in FIG. 2, the reaction chamber (14) may be withdrawn from the cavity (36) of the heat transfer member in order to provide for placement therein of a different reaction chamber freshly charged with fuel.

While the present invention has been depicted and described by reference to a single preferred embodiment thereof, no limitation upon the invention is implied by such reference, and none is to be inferred. The invention is intended to be limited only by the spirit and scope of the appended claims which provide additional definition of the invention. Many modifications and alterations to the present invention will suggest themselves to those skilled in the pertinent art. These modifications and alterations are intended to fall within the scope of the appended claims. For example, the sleeve-like heat transfer member (16) may conveniently be structured to define that which is generally referred to as a heat pipe rather than being completely filled with a heat transfer liquid as depicted according to the preferred embodiment herein. Such a heat pipe structure will contain both a liquid and a vapor phase of a mass-transport heat transfer medium. Because of the vapor phase of such a device it will be more resilient than the preferred embodiment of the invention herein disclosed, which has only the resilience of the gas pressurized chamber (74). However, the Applicant believes that the two-phase heat pipe structure may be pressurized and expanded sufficiently to provide the desired mechanical heat source and the heat exchanger.

I claim:

1. Apparatus comprising:
   heat source means for selectively supplying heat energy and defining an axially elongate outwardly disposed cylindrical first heat transfer surface through which said heat energy is delivered;
   heat exchanger means for defining a flow path for a flow of working heat transfer fluid and for receiving said heat energy in heat exchange relation with said flow of working fluid, said heat exchanger means including an axially elongate inwardly disposed cylindrical second heat transfer surface in part defining an axially elongate cylindrical cavity opening axially at one end thereof;
   said heat source means being received axially into said heat exchanger means through said axial opening of said cavity, said heat transfer surfaces defining a radial gap therebetween;
   an elongate cylindrically tubular expansible heat transfer means received in said radial gap between said heat transfer surfaces for in a first contracted condition movably engaging at least one of said heat transfer surfaces to allow relative axial movement between said heat source means and said heat exchanger means, and in a second expanded condition substantially immovably engaging both said heat transfer surfaces to both unite said heat source means and said heat exchanger means and to transfer said heat energy therebetween;
   said expansible heat transfer means further including means for selectively changing the former between said contracted condition and said expanded condition; and
   said heat transfer means including a pair of axially elongate cylindrically tubular walls which are axially coextensive and radially spaced apart substantially throughout the axial length thereof to define a radial space therebetween, means adjacent the axial ends of said pair of walls for sealingly uniting the latter to define a void within said heat transfer means, and liquid heat conducting means received in said void.

2. The invention of claim 1 wherein said selective changing means includes means defining a variable-volume chamber, conduit means communicating said variable-volume chamber with said void, liquid heat conducting means filling both said variable-volume chamber and said conduit means, and means for selectively changing the volume of said variable-volume chamber to force said liquid heat conducting means therefrom into said void or to withdraw said liquid from said void into said variable-volume chamber.

3. The invention of claim 2 wherein said means for selectively changing said variable-volume chamber includes a bellows member on one side bounding said variable-volume chamber and on the opposite side bounding a second variable-volume chamber expanding and contracting in opposition to said variable-volume chamber, and elastic means for expanding and contracting said second variable-volume chamber.

4. The invention of claim 3 wherein said elastic means includes a variable-pressure volume of gas selectively elevated above ambient pressure to move said heat transfer liquid into said void and changing said heat transfer means to said second condition, or evacuated below ambient pressure to move said heat transfer liquid from said void into said variable-volume chamber to change said heat transfer means to said first condition.

5. The invention of claim 1 wherein said liquid heat transfer means is essentially a eutectic alloy of metallic sodium and metallic potassium which is liquid at ordinary room temperature ambient condition.

6. The invention of claim 1 wherein said sealing uniting means includes respective axial marginal edge portions of each of said pair of tubular walls extending radially toward the other of said pair of walls to meet and define a circumferentially extending joint with the juxtaposed marginal edge portion of the other of said pair of walls, and weld means sealing said joints.

7. The method of associating a heat source and a heat receiver both mechanically and in favorable heat transfer relation while providing for ready disassociation thereof; said method including the steps of:
providing said heat source with an axially elongate cylindrical outer heat delivery surface;
providing said heat receiver with an axially elongate cylindrical cavity movably receiving said cylindrical outer surface and having an inwardly disposed cylindrical heat receiving surface confronting said outer surface but spaced therefrom to define a cylindrical gap;
providing a tubular sleeve-like expansible heat transfer member in a first contracted position being slidably receivable into said cylindrical gap between said heat source and said heat receiver and closely confronting said heat delivery and heat receiving surfaces;
reversibly expanding said heat transfer member in said gap to a second expanded radially thickened position intimately engaging both said heat delivery and said heat receiving surfaces to substantially prevent relative movement thereof;
employing said heat transfer member to transfer heat energy between said heat delivery and heat receiving surfaces;
contracting said heat transfer member from said second position to said first position, and removing said cylindrical outer surface of said heat source from said cavity; and
said step of providing said heat transfer member further including the steps of providing a pair of elongate flexibly shape-retaining tubular sleeve-like wall members each including respective axial marginal edges at each end thereof, disposing said pair of wall members in axially coextensive radially spaced and coaxial relation to define an axially, radially and circumferentially extending space therebetween, sealingly uniting said pair of wall members at said respective axial marginal edges to define an expansible chamber in said space therebetween, and filling said expansible chamber with a selectively variable volume of substantially incompressible liquid having a comparatively low vapor pressure at selected elevated operating temperatures as well as a high heat transfer conductivity.

8. The method of claim 7 including the step of using a eutectic alloy of sodium (Na) and potassium (K) (i.e., NaK) as said liquid filling for said expansible chamber.

9. The method of claim 7 wherein the steps of expanding and contracting said heat transfer member between said second and said first positions, respectively, includes the steps of, respectively, increasing the volume of said liquid within said exansible chamber, and decreasing the volume of said liquid within said expansible chamber.

10. The method of claim 9 wherein said steps of increasing and decreasing the volume of said liquid within said expansible chamber includes the steps of providing a chambered housing, dividing the chamber of said housing into a pair of variable-volume cavities expanding and contracting in opposition, communicating one of said pair of variable-volume cavities with said expansible chamber, filling said one variable-volume cavity also with said liquid, and expanding and contracting, respectively, the other of said pair of variable-volume cavities.

11. The invention of claim 10 wherein said steps of expanding and contracting said other variable-volume cavity includes the steps of, respectively, communicating said other cavity with a source of pressuruzed gas, and communicating said other cavity with a source of sub-ambient (vacuum) pressure or with ambient pressure.

* * * * *